(12) United States Patent
Astrachan et al.

(10) Patent No.: US 7,072,632 B2
(45) Date of Patent: Jul. 4, 2006

(54) FAST SIGNAL DETECTION PROCESS

(75) Inventors: Paul Morris Astrachan, Austin, TX (US); James Ward Girardeau, Jr., Austin, TX (US)

(73) Assignee: VIXS, Inc., Toronto (CA)

( * ) Notice: Subject to any disclaimer, the term of this patent is extended or adjusted under 35 U.S.C. 154(b) by 419 days.

(21) Appl. No.: 10/683,955

(22) Filed: Oct. 10, 2003

(65) Prior Publication Data
US 2005/0079841 A1   Apr. 14, 2005

(51) Int. Cl.
H04B 17/00   (2006.01)
(52) U.S. Cl. ............... 455/226.2; 455/232.1; 455/67.11
(58) Field of Classification Search .......... 455/226.1, 455/226.2, 232.1, 234.1, 115.1, 115.3, 67.11, 455/67.13, 136, 73, 123, 250.1; 324/76.11; 375/316; 343/703
See application file for complete search history.

(56) References Cited

U.S. PATENT DOCUMENTS

| | | | | |
|---|---|---|---|---|
| 6,671,331 B1 * | 12/2003 | Sakuma | ................... | 455/67.13 |
| 6,873,832 B1 * | 3/2005 | Shi | ........................ | 455/234.1 |
| 6,944,427 B1 * | 9/2005 | Haub et al. | ............... | 455/67.13 |
| 2005/0026564 A1 * | 2/2005 | Haub et al. | ............... | 455/226.1 |
| 2005/0143034 A1 * | 6/2005 | Khorram | ................. | 455/234.1 |
| 2005/0215219 A1 * | 9/2005 | Khorram | ................. | 455/226.1 |

* cited by examiner

Primary Examiner—Aung Moe
(74) Attorney, Agent, or Firm—Garlick Harrison & Markison LLP; Timothy W. Markison (57) ABSTRACT

A valid signal may be detected by initializing gain settings of the receiver section. The processing then continues by measuring received signal strength of a signal received by the receiver section to produce a $1^{st}$ received signal strength indication (RSSI). The processing continues by adjusting the gain setting of the receiver section such that the $1^{st}$ received signal strength indication is a predetermined offset less than a signal strength threshold. The process then continues by measuring the received signal strength of the gain adjusted representation of the signal to produce a $2^{nd}$ received signal strength indication. The processing continues by appending a $2^{nd}$ offset to the $2^{nd}$ received signal strength value to produce an adjusted received signal strength indication value when the $2^{nd}$ received signal strength value drifts from the signal strength threshold less the predetermined offset. The processing continues by measuring the received signal strength of received signals and appending the offset until a possible valid signal is detected. When the possible valid signal is detected, the gain of the receiver is adjusted based on its dynamic range.

28 Claims, 6 Drawing Sheets radio receiver 10

FIG. 1
radio receiver 10

Figure 2
receiving noise, increase gain of RX to get desired offset and adjust for drift

FAST SIGNAL DETECTION PROCESS

CROSS REFERENCE TO RELATED PATENTS

BACKGROUND OF THE INVENTION

1. Technical Field of the Invention

This invention relates generally to wireless communications and more particularly to radio receivers used within such wireless communication systems.

2. Description of Related Art

Wireless communication systems are known to include a plurality of wireless communication devices that communicate over wireless communication channels, which are supported by wireless communication infrastructure equipment (e.g., base stations, access points, system controllers, wide area network interfaces, local area network interfaces, et cetera). Each wireless communication device, which may be a radio, cellular telephone, station coupled to a personal digital assistant, personal computer, laptop, et cetera, includes a radio transmitter and a radio receiver. The radio transmitter includes a baseband processor, one or more intermediate frequency stages, filters, and a power amplifier coupled to an antenna. The baseband processor encodes and/or modulates, in accordance with a wireless communication standard such as IEEE 802.11a, IEEE802.11b, Bluetooth, Global System for Mobile communications (GSM), Advanced Mobile Phone Service (AMPS), et cetera, to produce baseband signals. The one or more intermediate frequency stages mix the baseband signals with one or more local oscillations to produce a radio frequency signal. The filter filters the radio frequency signal to remove unwanted frequency components and the power amplifier amplifies the filtered radio frequency signal prior to transmission via the antenna.

A radio receiver is known to include a low noise amplifier, one or more intermediate frequency stages, filters, analog to digital converters, and a receiver baseband processor. The low noise amplifier amplifies radio frequency (RF) signals received via an antenna and provides the amplified RF signals to the one or more intermediate frequency stages. The one or more intermediate frequency stages mixes the amplified RF signal with one or more local oscillations to produce a receive baseband signal. The analog to digital converters convert the received baseband signal into a digital baseband signals. The receiver baseband processor, in accordance with a particular wireless communication standard, decodes and/or demodulates the digital baseband signals to recapture data therefrom.

As is further known, the magnitude of an RF signal received by the receiver may vary by 80 dB or more. As such, the receiver includes an automatic gain control module to control the gain of the low noise amplifier, the intermediate frequency stage or stages, the filters and/or the analog-to-digital converters to keep the magnitude of the received signal at levels within the dynamic operating range of the circuitry comprising the receiver.

Prior to receiving a valid RF signal, the automatic gain control sets the gain of the receiver at a level to detect the presence of the weakest signal allowed by the governing standard. As such, the gain of the receiver, which includes multiple gain stages, is set very high. With the gain of the receiver set in this manner, the receiver measures the signal strength of what it is receiving and compares it to a threshold. In the absence of a valid signal, the receiver is receiving noise. To distinguish between noise and a weak valid signal, the automatic gain control sets the gain of the receiver such that the signal strength of the noise is a fixed power level below a potentially valid signal threshold (e.g., 10 dB below the threshold).

An issue with this signal detection approach is that, over time, the signal strength of the noise varies due to environmental changes in which the receiver is located. If these variations are not accounted for, valid signals may be missed (i.e., the sensitivity of the receiver is reduced) or the receiver will produce false/positive signal detections (i.e., the signal level of the noise will approach the threshold). The former results when the signal strength of the noise decreases and the later occurs when the signal strength of the noise increases.

To reduce the false/positive signal detects and the decreased receiver sensitivity, many receivers have the automatic gain control adjust the gain stages of the receiver to keep the signal strength of the noise at the predetermined value below the threshold. An issue with this approach is that the gain increments/decrements are finite and that to achieve the desired adjusted gain of the multiple gain stages; several of the gain stages are adjusted. If the gain stages are adjusted at the same time, a significant fluctuation in the signal level may occur, causing a false positive signal detect. To avoid this, the gain stages are adjusted sequentially, which requires a fair amount of time. Thus, if a valid but weak signal is received while the gain is being adjusted, the signal may be missed, especially for signals having a short training sequence such as those prescribed in the IEEE 802.11 standard.

Therefore, a need exists for a method and apparatus for quickly detecting the presence of a valid signal and improving receiver sensitivity in comparison to the above.

BRIEF SUMMARY OF THE INVENTION

The low power valid signal detection process of the present invention substantially meets these needs and others. In one embodiment, a valid signal may be detected by initializing gain settings of the receiver section. The processing then continues by measuring received signal strength of a signal received by the receiver section to produce a $1^{st}$ received signal strength indication (RSSI). The processing continues by adjusting the gain setting of the receiver section such that the $1^{st}$ received signal strength indication is a predetermined offset less than a signal strength threshold. The process then continues by measuring the received signal strength of the gain adjusted representation of the signal to produce a $2^{nd}$ received signal strength indication. The processing continues by appending a $2^{nd}$ offset to the $2^{nd}$ received signal strength value to produce an adjusted received signal strength indication value when the $2^{nd}$ received signal strength value drifts from the signal strength threshold less the predetermined offset. This adjustment substantially maintains the signal strength threshold less the adjusted RSSI value to be substantially equal to the predetermined offset. The processing continues by measuring the received signal strength of received signals and appending the offset until a possible valid signal is detected. When the possible valid signal is detected (e.g., the signal strength exceeds the threshold or a cross correlation indicates a possible signal), the gain of the receiver is adjusted based on its dynamic range. With such a method, the gain of the receiver is set once until a potentially valid signal is received. Thus, by appending an offset to the received signal strength indication, the gain of the receiver does not need to be changed, which improves the receiver's sensitivity and reduces latencies that cause the receiver to miss valid signals.

DETAILED DESCRIPTION OF THE INVENTION

Figure 1:
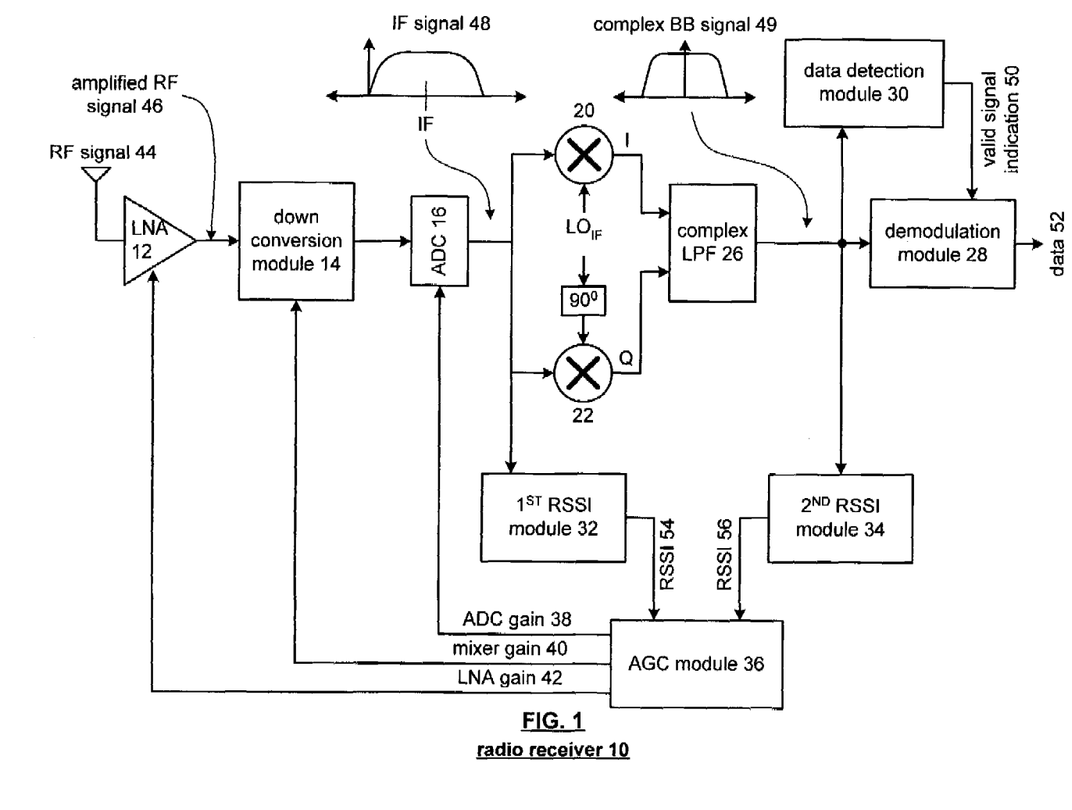
FIG. 1 is a schematic block diagram of a radio receiver in accordance with the present invention.

FIG. 1 is a schematic block diagram of a radio receiver 10 that includes low noise amplifier 12 operably coupled to an antenna, a down-conversion module 14, analog-to-digital converter (ADC) 16, two multipliers 20 and 22, a complex low pass filter 26, a demodulation module 28, a data detection module 30, a $1^{st}$ received signal strength indication (RSSI) module 32, a $2^{nd}$ RSSI module 34 and an automatic gain control (AGC) module 36. In operation, the low noise amplifier 12 amplifies a radio frequency (RF) signal 44, which is received via the antenna, to produce an amplified RF signal 46. The down conversion module 14 converts the amplified RF signal 46 into an intermediate frequency signal 48. The down conversion module 14 produces the IF signal 48 by mixing the amplified RF signal 46 with a local oscillation.

The analog-to-digital converter 16 converts the intermediate frequency signal 48 into digital signals. As shown, the frequency spectrum of the IF signal 48 is centered about the intermediate frequency and may have a bandwidth of approximately 80 megahertz for IEEE 802.11 applications. The mixers 20 and 22 mix the digital IF signal 48, respectively, with an in-phase and quadrature component of a local oscillation ($LO_{IF}$) to produce an in-phase (I) component and a quadrature (Q) component. The complex low pass filter 26 filters the I and Q components to produce a complex baseband signal 49. The complex baseband signal 49 may have a frequency spectrum centered about 0 hertz and may have a bandwidth of approximately 20 megahertz for IEEE 802.11 applications.

The data detection module 30 is operably coupled to determine when the complex baseband signal 49 is a valid signal. When the complex baseband signal 49 is a valid signal, the data detection module generates a valid signal indication 50 that is provided to the demodulation module 28. The demodulation module 28, in response to the valid signal indication 50, recaptures data 52 from the complex baseband signal 49.

The low noise amplifier 12, down-conversion module 14, which includes mixers, and the analog-to-digital converter 16 have a nominal dynamic range of operation that, if exceeded, clips the processing of the received RF signal 44. As such, the automatic gain control module 36, based on signal strength indications RSSI 54 and/or RSSI 56, controls the gain of the low noise amplifier 12, the down-conversion module 14 and/or the analog-to-digital converter 16 via LNA gain signal 42, mixer gain signal 40, and/or ADC gain signal 38. As such, when a valid baseband signal 49 is being received, the AGC module 36 generates gain control signals 38–42 to ensure that the processing of the RF signal falls within the nominal dynamic operating range of the LNA 12, the down-conversion module 14, and the analog-to-digital converter 16.

Prior to a valid baseband signal 49 being received, the AGC module 36 sets the gain of the LNA 12, the down-conversion module 14, and/or the analog-to-digital converter 16 to detect a weak, but valid incoming RF signal 44. The AGC module 36 sets the gain of these components once such that the noise level is a predetermined signal strength level below a possible valid signal strength. Thus, as the noise level and/or the gain of the receiver drift over time, the receiver 10 accounts for the drift, as further described with reference to FIGS. 2–7, without having to change of the gain of the receiver. As such, the radio receiver 10 of FIG. 1, quickly and accurately detects the presence of an incoming valid signal since the gains of the receiver are not continually updated, which also improves the receiver's sensitivity since the threshold between a valid signal trigger-point and the measured signal strength of noise is maintained.

Figure 2:
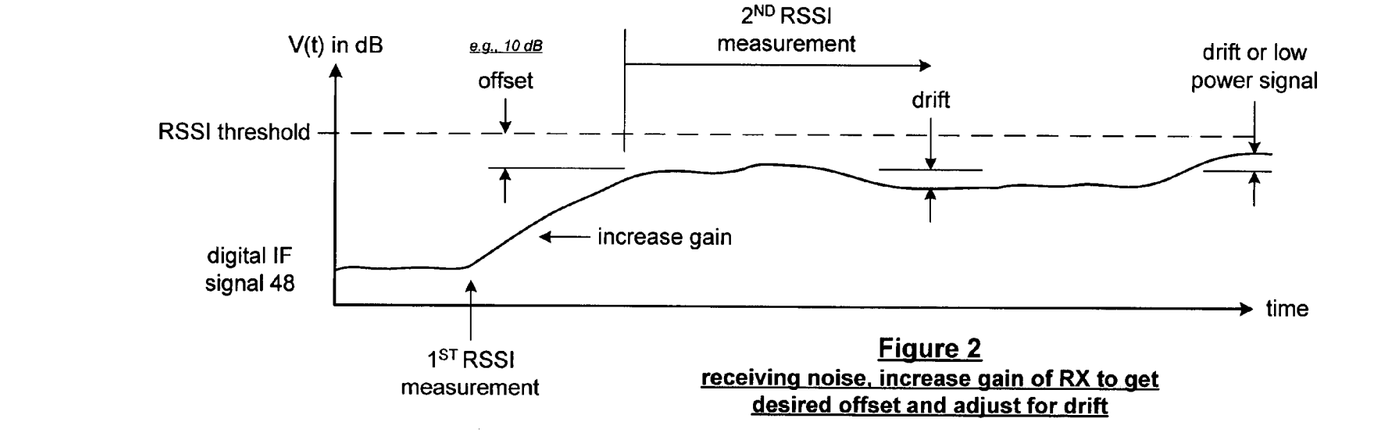
FIG. 2 is a graph of the signal strength of a signal received via the receiver of FIG. 1 in comparison with a signal strength indication threshold.

FIG. 2 illustrates a graph of the receiver 10 of FIG. 1 receiving noise and the AGC module 36 adjusting the sensitivity of the receiver prior to a valid signal being received. As shown, the graph plots the magnitude, in decibels, of the digital IF signal 48 versus time. An initial measurement is made via the $1^{st}$ RSSI module 32 to produce the $1^{st}$ RSSI value 54. Based on this value, the AGC module 36 increases the gain (or decreasing as the case may be) of the LNA 12, the down-conversion module 14, and/or the analog-to-digital converter 16 such that the adjusted signal strength of the digital IF signal 48 is a predetermined offset less than the RSSI threshold. The predetermined offset may be, for example, 10 dB. The gain of the LNA, the down-conversion module, and the analog-to-digital converter, will remain at this level until a valid signal is indicated.

As further shown in FIG. 2, as time passes, the signal strength of the digital IF signal 48 drifts. Via the $1^{st}$ RSSI signal 54 and/or the $2^{nd}$ RSSI signal 56, which is produced by the $2^{nd}$ RSSI module 34, the AGC module 36 mathematically accounts for the drift such that, from a mathematical prospective, the signal strength of the digital IF signal 48 is maintained at the RSSI threshold less the offset. This may be done by determining the amount of drift and appending the drift, as a $2^{nd}$ offset, to the $2^{nd}$ RSSI value, which may correspond to the $1^{st}$ or $2^{nd}$ RSSI signal, of the digital IF signal 48 to produce an adjusted RSSI value. For example, if the RSSI threshold is at −80 dB, the offset is −10 dB, then the digital IF signal 48 should have a signal strength of −90 dB after the initial adjustment of the gains of the LNA, down-conversion module and the ADC. If the signal strength of the digital IF signal 48 drifts by −3 dB to −93 dB, then the magnitude of the −3 dB drift (i.e., 3 dB) is appended to the digital IF signal 48 such that the effective digital IF signal strength is −90 dB.

As time continues, the drift may increase the signal strength of the digital IF signal 48 which may indicate that a low power signal is being received or drift is occurring that would require mathematical compensation as previously described.

Figure 3:
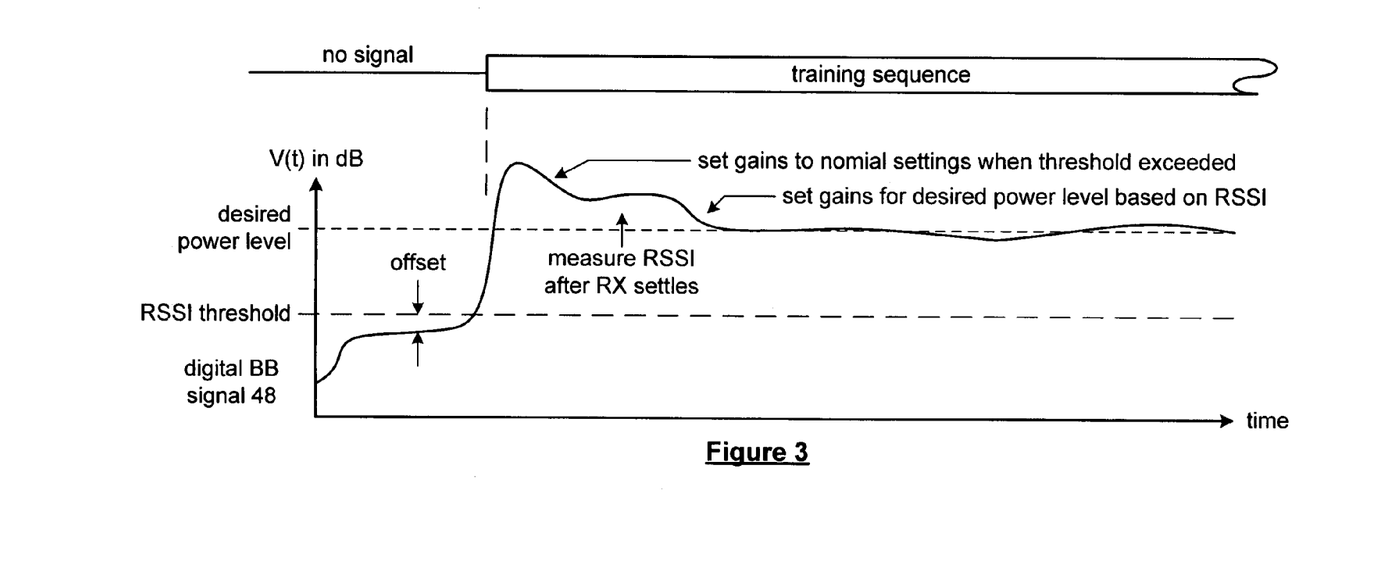
FIG. 3 is a graph illustrating the signal strength of a possibly valid signal as processed by the receiver of FIG. 1.

FIG. 3 illustrates a graph of when a valid signal is being received. As shown, the gain of the LNA, the down-conversion module, and the analog-to-digital converter are initially set such that the signal strength of the digital IF signal 48 is the offset value below the RSSI threshold. When a valid signal is received, the signal strength of the digital IF signal 48 increases dramatically exceeding the RSSI threshold and may exceed the desired power level. At this point, the AGC module 36 sets the gains of the LNA 12, the down-conversion module 14, and/or the analog-to-digital converter 16 to nominal gain settings. For example, if the signal strength of a received signal can vary from −20 dB to −80 dB, the nominal settings would correspond to a −50 dB signal.

Once the receiver has settled with respect to the nominal gain settings, the signal strength is again measured via the $2^{nd}$ RSSI module 34. Based on this measurement, the AGC module 36 adjusts the gains of the LNA 12, the down-conversion module 14, and/or the analog-to-digital converters 16 and 18 such that the power level of the received digital IF signal 48 is at a desired power level. As one of average skill in the art will appreciate, the magnitude of the digital IF signal 48 may not exceed the desired power level, but exceed the RSSI threshold, as such, the nominal gains would still be set by the AGC module 36 and subsequently increased such that the desired power level is established.

Figure 4:
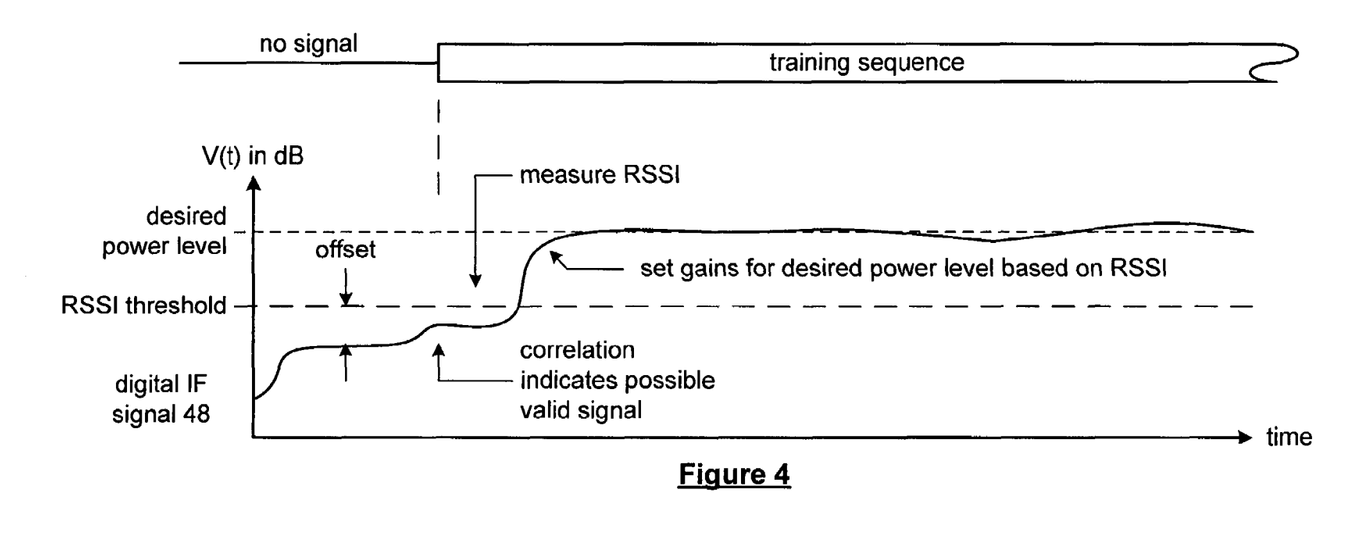
FIG. 4 is a graph of processing a possibly valid signal by the receiver of FIG. 1.

FIG. 4 is a graph representing the receiver 10 receiving a weak, but valid, RF signal 44. As shown, the AGC module 36 initially adjusts the gain of the LNA, the down-conversion module 14, and/or the analog-to-digital converters 16 and 18 such that the signal strength of the digital IF signal is at a level that is the RSSI threshold less the offset. At a later point and time, a correlation process within the data detection module 30 indicates that the RF signal 44 may be a valid signal, which commences as a training sequence of the signal. At this point, the $2^{nd}$ RSSI module 34 measures the signal strength of the baseband signal, which is used to adjust the gain settings of the LNA, the down-conversion module, and/or the analog-to-digital converters such that the signal is at the desired power level.

Figure 5:
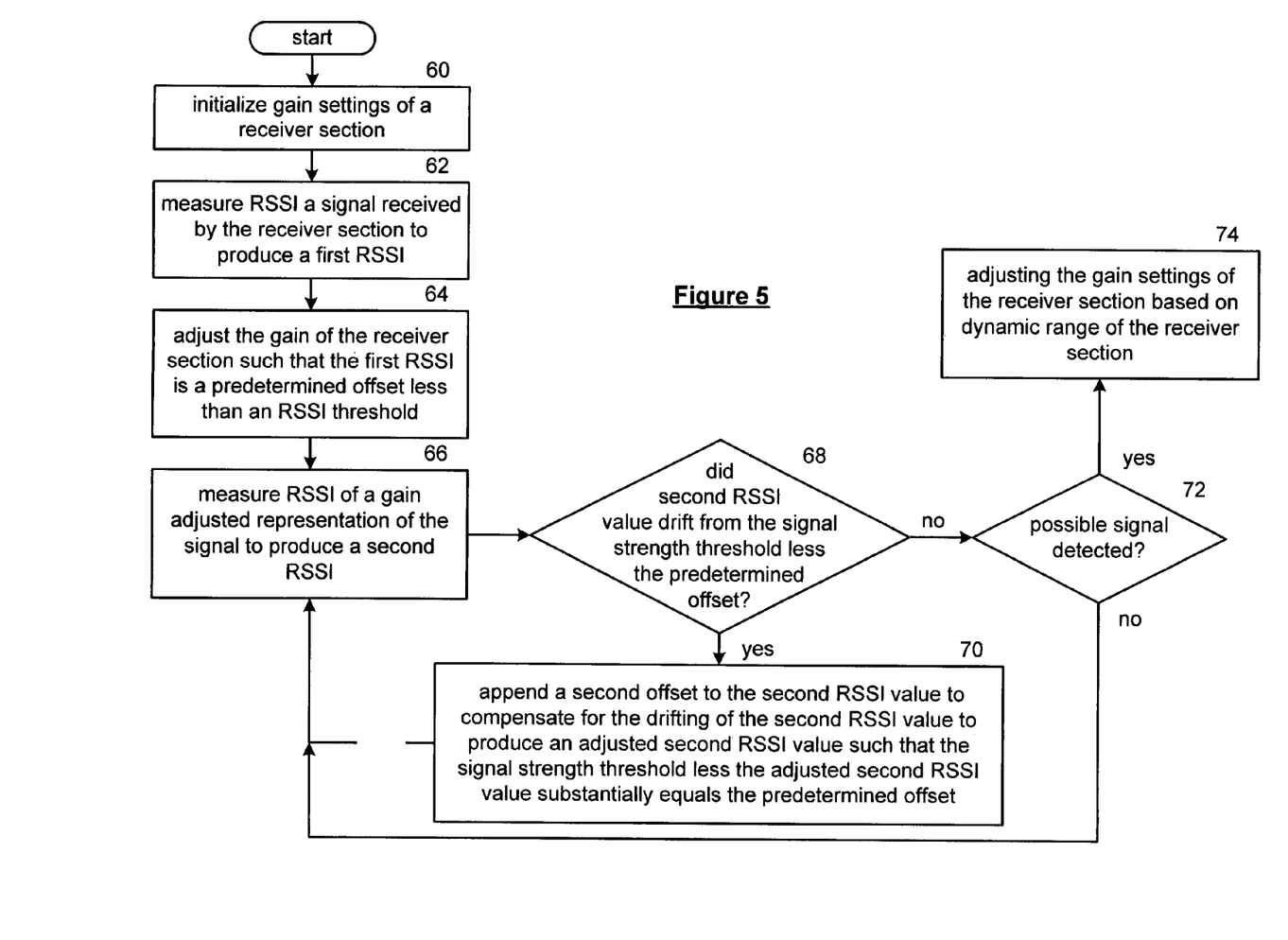
FIG. 5 is a logic diagram of a method for detecting the presence of a valid signal in accordance with the present invention.

FIG. 5 is a logic diagram of a method for detecting the presence of a valid signal. The process begins at Step 60 where gain settings of a receiver section (the LNA, the down-conversion module, and/or the analog-to-digital converters) is initialized. This was described with reference to FIGS. 2–4. The process then proceeds to Step 62 where the received signal strength indication of a signal is measured to produce a $1^{st}$ RSSI value. The process then proceeds to Step 64 where the gain of the receiver section is adjusted such that the $1^{st}$ RSSI value is a predetermined offset less than an RSSI threshold. This was also illustrated and discussed with reference to FIGS. 2–4.

The process then proceeds to Step 66 where the RSSI of the gain adjusted representation of the signal is measured to produce a $2^{nd}$ RSSI value, which may be done by the $1^{st}$ or $2^{nd}$ RSSI module. The process then proceeds to Step 68 where determination is made as to whether the $2^{nd}$ RSSI value drifts from the signal strength threshold (e.g., the RSSI threshold) less the predetermined offset. If so, the process proceeds to Step 70 where the drift is measured and appended to the $2^{nd}$ RSSI value as a $2^{nd}$ offset to compensate for the drifting. This mathematical adjustment maintains the adjusted RSSI value at a value corresponding to the signal strength threshold less the predetermined offset without having to adjust the actual gains of the LNA, the down-conversion module, and/or the ADCs. The process then proceeds to Step 72 where determination is made as to whether a possible signal is detected. If not, the process repeats at Step 66. If so, the process proceeds to Step 74 where the gains of the receiver section are adjusted based on the dynamic range of the receiver section (e.g., sent to a nominal value within the dynamic range).

Figure 6:
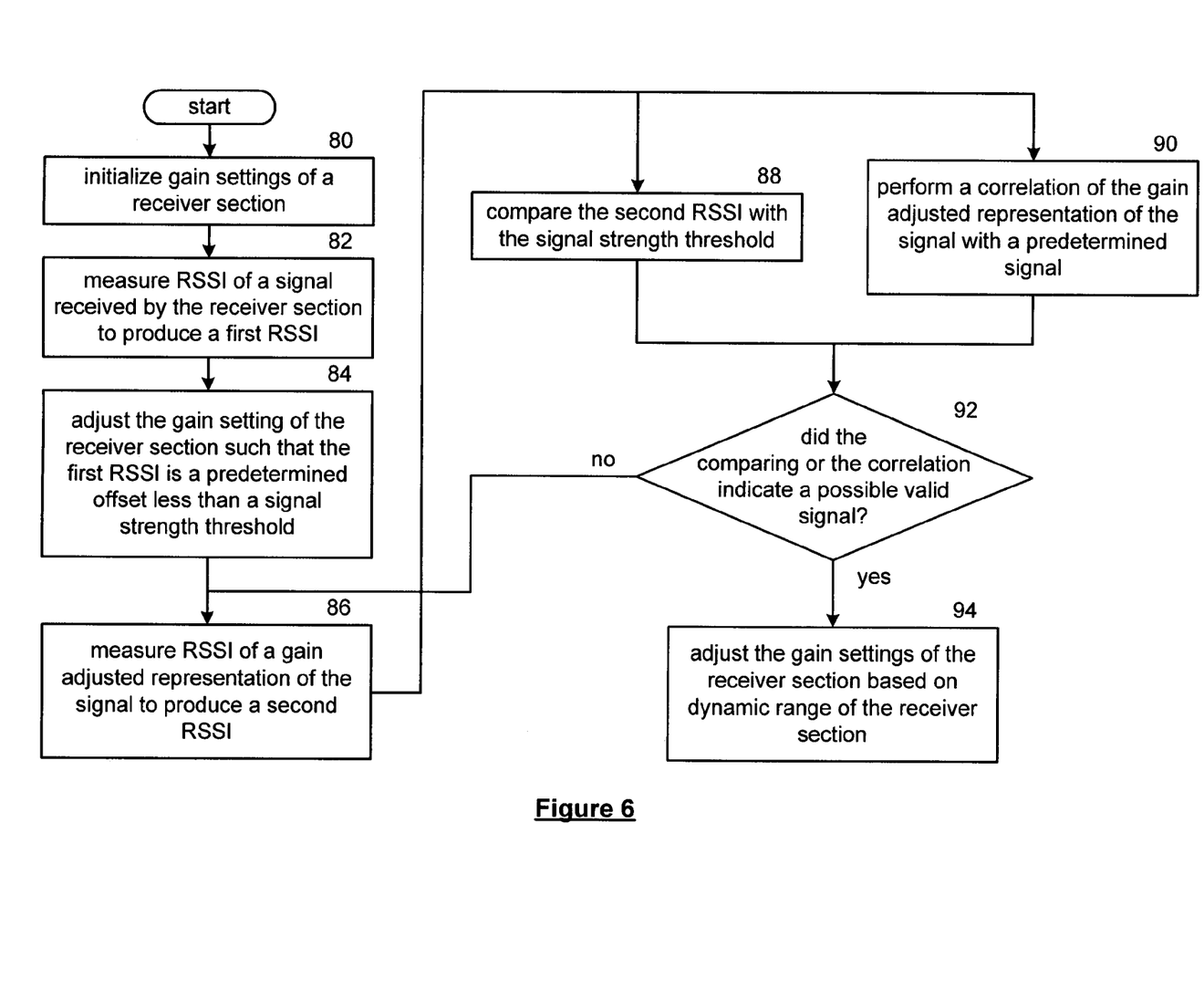
FIG. 6 is a logic diagram of an alternate method for detecting the presence of a valid signal in accordance with the present invention.

FIG. 6 is a logic diagram of an alternate method for detecting presence of a valid signal in an RF receiver. The process begins at Step 80 where the gain settings of the receiver section are initialized. The process then proceeds to Step 82 where the received signal strength indication of the signal received by the receiver section is measured to produce a $1^{st}$ RSSI value. The process then proceeds to Step 84 where the gain settings of the receiver section are adjusted such that the $1^{st}$ RSSI value is a predetermined offset less than a signal strength threshold.

The process then proceeds to Step 86 where the RSSI of the gain adjusted representation of the signal is measured to produce a $2^{nd}$ RSSI value, which may be done via the $1^{st}$ or $2^{nd}$ RSSI module. The RSSI value may be mathematically adjusted over time prior to the reception of a possible valid signal as described with reference to FIGS. 2–4. The process proceeds to Step 88 and 90. At Step 88, the $2^{nd}$ RSSI value is compared with a signal strength threshold. At Step 90, a correlation is performed on the gain adjusted representation of the signal with a predetermined signal.

The process then proceeds to Step 92 where the determination is made as to whether the comparison or the correlation indicates a possible valid signal. If not, the process reverts back to Step 86 and continues in a loop of Steps 86–92 until a possible valid signal is indicated. Once a possible valid signal is indicated, the process proceeds to Step 94 where the gain settings of the receiver section are adjusted based on the dynamic range of the receiver to operate at a desired power level.

Figure 7:
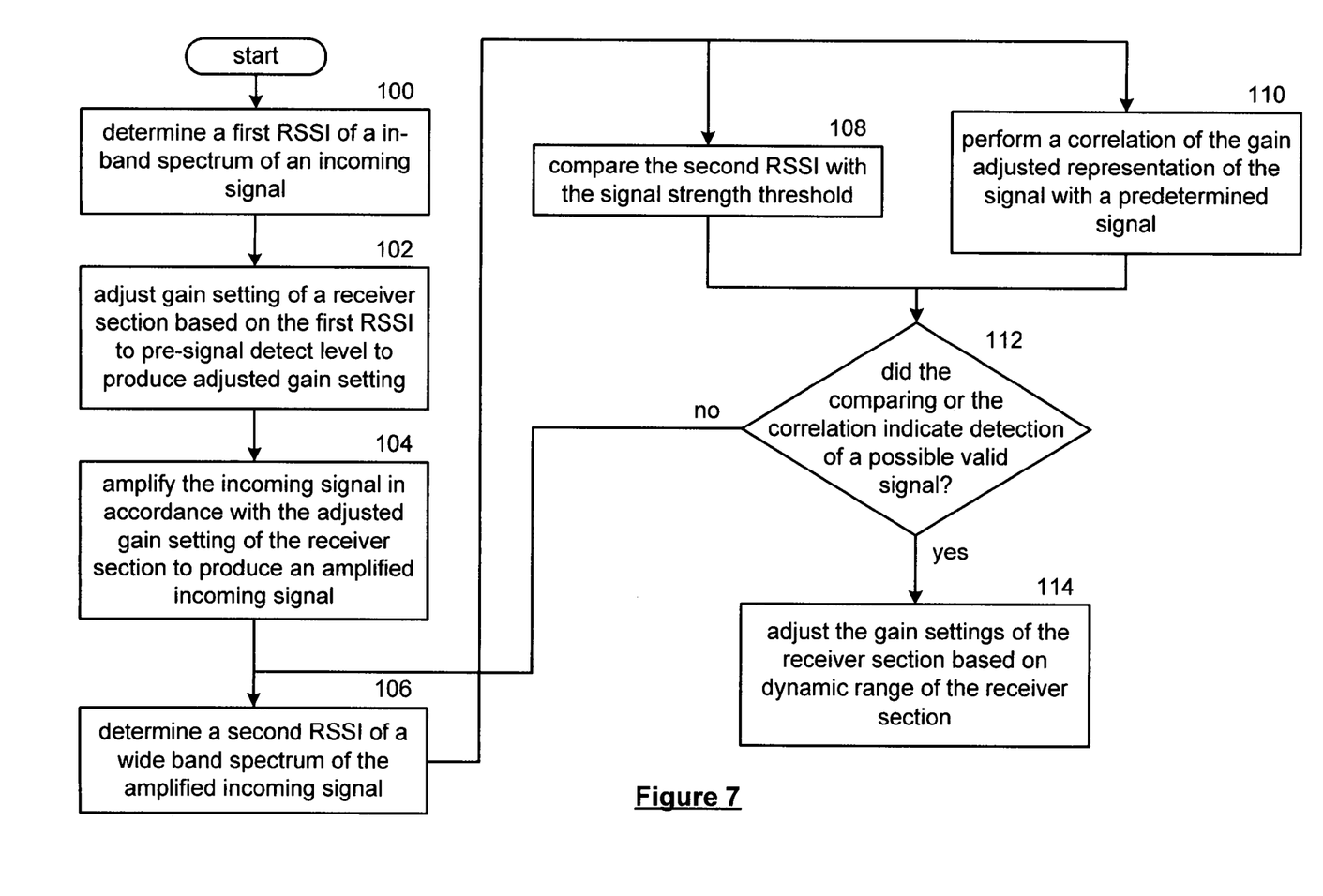
FIG. 7 is a logic diagram of yet another method for detecting the presence of a valid signal in accordance with the present invention.

FIG. 7 is a logic diagram of another method for detecting the presence of a valid signal. The process begins at Step 100 where a $1^{st}$ RSSI value of an in-band spectrum of an incoming signal is determined. This may correspond to measuring the signal strength of the complex baseband signal. The process then proceeds to Step 102 where the gain settings of the receiver section are adjusted based on the $1^{st}$ RSSI value to a pre-signal detect level to produce an adjusted gain setting. The process then proceeds to Step 104 where an incoming signal is amplified in accordance with the adjusted gain setting of the receiver section to produce an amplified incoming signal.

The process then proceeds to Step 106 where a $2^{nd}$ RSSI value is determined for wide band spectrum of the amplified incoming signal, this may correspond to the IF signal. The process then proceeds to Step 108 and 110. At Step 108, the $2^{nd}$ RSSI value is compared with a signal strength threshold. At Step 110, a correlation is performed on the gain adjusted representation of the signal with a predetermined signal.

The process then proceeds to Step 112 where a determination is made as to whether the comparison and/or the correlation indicates a possible valid signal. If not, the process reverts to Step 106 and remains in a loop of Steps 106–112 until a possible signal is indicated. Once a possible signal is indicated, the process proceeds to Step 114 where the gain settings of the receiver section are adjusted based on the dynamic range of the receiver section.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for detecting the presence of a valid signal while reducing the power consumption to do so and improving the receiver sensitivity. By avoiding continually adjusting the receiver sections gain prior to the reception of a valid signal, power consumption is reduced as well as receiver sensitivity is at least maintained. As one of average skill in the art will appreciate, other embodiments may be derived from the teachings of the present invention without deviating from the scope of the claims.

What is claimed is:

1. A method for detecting presence of a valid signal, the method comprises:
    initializing gain settings of a receiver section;
    measuring received signal strength of a signal received by the receiver section to produce a first received signal strength indication (RSSI);
    adjusting the gain setting of the receiver section such that the first RSSI is a predetermined offset less than a signal strength threshold;
    measuring the received signal strength of a gain adjusted representation of the signal to produce a second RSSI;
    when the second RSSI value drifts from the signal strength threshold less the predetermined offset, appending a second offset to the second RSSI value to compensate for the drifting of the second RSSI value to produce an adjusted second RSSI value such that the signal strength threshold less the adjusted second RSSI value substantially equals the predetermined offset;
    continuing measuring the received signal strength of the gain adjusted representation of the signal and appending an updated offset to the adjusted second RSSI value when the adjusted second RSSI value drifts from the signal strength threshold less the predetermined offset until a possible signal is detected; and
    when the possible signal is detected, adjusting the gain settings of the receiver section based on dynamic range of the receiver section.

2. The method of claim 1 further comprises:
    determining the drift of the second RSSI value by determining a difference value based on a difference between the second RSSI value and the signal strength threshold; and
    when the difference value is greater than a drift threshold, generating the second offset based on the difference value.

3. The method of claim 1 further comprises:
    detecting the possible signal based on a correlation of the gain adjusted representation of the signal with a reference signal;
    adjusting the gain setting of the receiver section to amplify the gain adjusted representation of the signal to produce an amplified signal; and
    after a settling delay, determining whether the amplified signal corresponds to a valid signal.

4. The method of claim 1 further comprises:
    detecting the possible signal when the second RSSI exceeds the signal strength threshold;
    adjusting the gain settings of receiver section to a nominal setting;
    after a settling delay, measuring signal strength of the signal received via the receive section with the gain settings at the nominal setting to produce a nominal setting RSSI value;
    adjusting the gain settings of the receiver section to an optimal setting based on the nominal setting RSSI value; and
    after a second settling delay, determining whether the amplified signal corresponds to a valid signal.

5. A method for detecting presence of a valid signal, the method comprises:
    initializing gain settings of a receiver section;
    measuring received signal strength of a signal received by the receiver section to produce a first received signal strength indication (RSSI);
    adjusting the gain setting of the receiver section such that the first RSSI is a predetermined offset less than a signal strength threshold to produce a gain adjusted representation of the signal;
    measuring the received signal strength of the gain adjusted representation of the signal to produce a second RSSI;
    comparing the second RSSI with the signal strength threshold;
    performing a correlation of the gain adjusted representation of the signal with a predetermined signal; and
    when the comparing of the second RSSI with the signal strength threshold or the performing the correlation of the gain adjusted representation indicates detection of a possible signal, adjusting the gain settings of the receiver section based on dynamic range of the receiver section.

6. The method of claim 5, wherein the measuring the received signal strength of the gain adjusted representation of the signal further comprises:
    measuring the received signal strength of a gain adjusted representation of the signal to produce the second RSSI;
    when the second RSSI value drifts from the signal strength threshold less the predetermined offset, appending a second offset to the second RSSI value to compensate for the drifting of the second RSSI value to produce an adjusted second RSSI value such that the signal strength threshold less the adjusted second RSSI value substantially equals the predetermined offset; and
    continuing measuring the received signal strength of the gain adjusted representation of the signal and appending an updated offset to the adjusted second RSSI value when the adjusted second RSSI value drifts from the signal strength threshold less the predetermined offset until the possible signal is detected.

7. The method of claim 6 further comprises:
determining the drift of the second RSSI value by determining a difference value based on a difference between the second RSSI value and the signal strength threshold; and
when the difference value is greater than a drift threshold, generating the second offset based on the difference value.

8. The method of claim 5 further comprises, when the performing the correlation of the gain adjusted representation indicates detection of the possible signal:
adjusting the gain setting of the receiver section to an optimal gain setting to amplify the gain adjusted representation of the signal to produce an amplified signal; and
after a settling delay, determining whether the amplified signal corresponds to a valid signal.

9. The method of claim 5 further comprises, when the comparing of the second RSSI with the signal strength threshold indicates detection of the possible signal:
adjusting the gain settings of receiver section to a nominal setting;
after a settling delay, measuring signal strength of the signal received via the receive section with the gain settings at the nominal setting to produce a nominal setting RSSI value;
adjusting the gain settings of the receiver section to an optimal setting based on the nominal setting RSSI value; and
after a second settling delay, determining whether the amplified signal corresponds to a valid signal.

10. A method for detecting presence of a valid signal, the method comprises:
determining a first received signal strength indication (RSSI) of an in-band spectrum of an incoming signal;
adjusting gain setting of a receiver section based on the first RSSI to pre-signal detect level to produce adjusted gain setting;
amplifying the incoming signal in accordance with the adjusted gain setting of the receiver section to produce an amplified incoming signal;
determining a second RSSI of a wide band spectrum of the amplified incoming signal;
comparing the second RSSI with the signal strength threshold;
performing a correlation of the gain adjusted representation of the signal with a predetermined signal; and
when the comparing of the second RSSI with the signal strength threshold or the performing the correlation of the gain adjusted representation indicates detection of a possible signal, adjusting the gain settings of the receiver section based on dynamic range of the receiver section.

11. The method of claim 10, wherein the determining the second RSSI further comprises:
determining whether the second RSSI value drifts from signal strength threshold less a predetermined offset;
when the second RSSI value drifts from the signal strength threshold less the predetermined offset, appending a second offset to the second RSSI value to compensate for the drifting of the second RSSI value to produce an adjusted second RSSI value such that the signal strength threshold less the adjusted second RSSI value substantially equals the predetermined offset; and
continuing measuring the received signal strength of the gain adjusted representation of the signal and appending an updated offset to the adjusted second RSSI value when the adjusted second RSSI value drifts from the signal strength threshold less the predetermined offset until the possible signal is detected.

12. The method of claim 11 further comprises:
determining the drift of the second RSSI value by determining a difference value based on a difference between the second RSSI value and the signal strength threshold; and
when the difference value is greater than a drift threshold, generating the second offset based on the difference value.

13. The method of claim 10 further comprises, when the performing the correlation of the gain adjusted representation indicates detection of the possible signal:
adjusting the gain setting of the receiver section to an optimal gain setting to amplify the gain adjusted representation of the signal to produce an amplified signal; and
after a settling delay, determining whether the amplified signal corresponds to a valid signal.

14. The method of claim 10 further comprises, when the comparing of the second RSSI with the signal strength threshold indicates detection of the possible signal:
adjusting the gain settings of receiver section to a nominal setting;
after a settling delay, measuring signal strength of the signal received via the receive section with the gain settings at the nominal setting to produce a nominal setting RSSI value;
adjusting the gain settings of the receiver section to an optimal setting based on the nominal setting RSSI value; and
after a second settling delay, determining whether the amplified signal corresponds to a valid signal.

15. A radio receiver comprises:
radio frequency (RF) front end operably coupled to convert an RF signal into a low intermediate frequency (IF) signal, wherein gain of the RF front end is established based on a front end gain setting control signal;
analog to digital converter operably coupled to convert the low IF signal into a digital low IF signal, wherein gain of the analog to digital converter is established based on an ADC gain setting control signal;
first power measurement module operably coupled to measure received signal strength of the digital low IF signal to produce a first RSSI value;
low pass filter operably coupled to filter the digital low IF signal to produce a digital filtered signal;
second power measurement module operably coupled to measure received signal strength of the digital filtered signal to produce a second RSSI value;
data detection module operable coupled to recapture data from the digital filtered signal when the digital filtered signal is a valid signal;
automatic gain control module operably coupled to generate the front end gain setting control signal and the ADC gain setting control signal by:
initializing the front end gain setting control signal and the ADC gain setting control signal;
adjusting the front end gain setting control signal and the ADC gain setting control signal such that the first RSSI is a predetermined offset less than a signal strength threshold;

when the second RSSI value drifts from the signal strength threshold less the predetermined offset, appending a second offset to the second RSSI value to compensate for the drifting of the second RSSI value to produce an adjusted second RSSI value such that the signal strength threshold less the adjusted second RSSI value substantially equals the predetermined offset;

continuing appending an updated offset to the adjusted second RSSI value when the adjusted second RSSI value drifts from the signal strength threshold less the predetermined offset until a possible signal is detected; and when the digital filtered signal is determined to be the valid signal, adjusting the gain settings of the receiver section based on dynamic range of the receiver section.

16. The radio receiver of claim 15, wherein the automatic gain control module further functions to:

determine the drift of the second RSSI value by determining a difference value based on a difference between the second RSSI value and the signal strength threshold; and when the difference value is greater than a drift threshold, generate the second offset based on the difference value.

17. The radio receiver of claim 15, wherein the automatic gain control module further functions to:

when the digital filtered signal is determined to possibly be valid based on a correlation of the digital filtered signal with a reference signal, adjust the front end gain control signal and the ADC gain control signal to an optimal level to amplify the gain adjusted representation of the signal to produce an amplified signal.

18. The radio receiver of claim 15, wherein the automatic gain control module further functions to:

adjust the front end gain control signal and the ADC gain control signal to a nominal level when the digital filtered signal is determined to possibly be valid based on the second RSSI exceeding the signal strength threshold;

after a settling delay, retrieve an updated second RSSI value from the second power measure module;

adjust the front end gain control signal and the ADC gain control signal to an optimal level based on the updated second RSSI value.

19. A radio receiver comprises:

radio frequency (RF) front end operably coupled to convert an RF signal into a low intermediate frequency (IF) signal, wherein gain of the RF front end is established based on a front end gain setting control signal;

analog to digital converter operably coupled to convert the low IF signal into a digital low IF signal, wherein gain of the analog to digital converter is established based on an ADC gain setting control signal;

first power measurement module operably coupled to measure received signal strength of the digital low IF signal to produce a first RSSI value;

low pass filter operably coupled to filter the digital low IF signal to produce a digital filtered signal;

second power measurement module operably coupled to measure received signal strength of the digital filtered signal to produce a second RSSI value;

data detection module operable coupled to recapture data from the digital filtered signal when the digital filtered signal is a valid signal;

correlation module operably coupled to determine possible validity of the digital filtered signal;

automatic gain control module operably coupled to generate the front end gain setting control signal and the ADC gain setting control signal by:

setting the front end gain control signal and the ADC control signal to initial settings;

adjusting the front end gain control signal and the ADC control signal such that the first RSSI value is a predetermined offset less than a signal strength threshold to produce a gain adjusted representation of the signal;

measuring the received signal strength of the gain adjusted representation of the signal to produce a second RSSI value;

comparing the second RSSI value with the signal strength threshold;

performing a correlation of the gain adjusted representation of the signal with a predetermined signal; and when the comparing of the second RSSI with the signal strength threshold or the correlation module indicates that the digital filtered signal is possibly valid, adjusting the gain settings of the receiver section based on dynamic range of the receiver section.

20. The radio receiver of claim 19, wherein the measuring the received signal strength of the gain adjusted representation of the signal further comprises:

when the second RSSI value drifts from the signal strength threshold less the predetermined offset, appending a second offset to the second RSSI value to compensate for the drifting of the second RSSI value to produce an adjusted second RSSI value such that the signal strength threshold less the adjusted second RSSI value substantially equals the predetermined offset; and continuing appending an updated offset to the adjusted second RSSI value when the adjusted second RSSI value drifts from the signal strength threshold less the predetermined offset until the possible signal is detected.

21. The radio receiver of claim 20, wherein the automatic gain control module further functions to:

determine the drift of the second RSSI value by determining a difference value based on a difference between the second RSSI value and the signal strength threshold; and when the difference value is greater than a drift threshold, generate the second offset based on the difference value.

22. The radio receiver of claim 19 further comprises, when the correlation module indicates the possibility that the digital filtered signal is the valid signal:

adjusting the front end gain control signal and the ADC gain control signal to an optimal gain setting.

23. The radio receiver of claim 19 further comprises, when the comparing of the second RSSI with the signal strength threshold indicates that the digital filtered signal is possibly a valid signal:

adjusting the front end gain control signal and the ADC gain control signal to a nominal setting;

after a settling delay, retrieving an updated second RSSI value from the second power measurement module; and adjusting the front end gain control signal and the ADC gain control signal to an optimal setting based on the updated second RSSI value.

24. An apparatus for detecting presence of a valid signal, the apparatus comprises:

processing module; and memory operably coupled to the processing module, wherein the memory includes operational instructions that cause the processing module to:
- determine a first received signal strength indication (RSSI) of an in-band spectrum of an incoming signal;
- adjust gain setting of a receiver section based on the first RSSI to pre-signal detect level to produce adjusted gain setting;
- amplify the incoming signal in accordance with the adjusted gain setting of the receiver section to produce an amplified incoming signal;
- determine a second RSSI of a wide band spectrum of the amplified incoming signal;
- compare the second RSSI with the signal strength threshold;
- perform a correlation of the gain adjusted representation of the signal with a predetermined signal; and
- when the comparing of the second RSSI with the signal strength threshold or the performing the correlation of the gain adjusted representation indicates detection of a possible signal, adjust the gain settings of the receiver section based on dynamic range of the receiver section.

25. The apparatus of claim 24, wherein the memory further comprises operational instructions that cause the processing module to determine the second RSSI by:
- determining whether the second RSSI value drifts from signal strength threshold less a predetermined offset;
- when the second RSSI value drifts from the signal strength threshold less the predetermined offset, appending a second offset to the second RSSI value to compensate for the drifting of the second RSSI value to produce an adjusted second RSSI value such that the signal strength threshold less the adjusted second RSSI value substantially equals the predetermined offset; and
- continuing measuring the received signal strength of the gain adjusted representation of the signal and appending an updated offset to the adjusted second RSSI value when the adjusted second RSSI value drifts from the signal strength threshold less the predetermined offset until the possible signal is detected.

26. The apparatus of claim 25, wherein the memory further comprises operational instructions that cause the processing module to:
- determine the drift of the second RSSI value by determining a difference value based on a difference between the second RSSI value and the signal strength threshold; and
- when the difference value is greater than a drift threshold, generate the second offset based on the difference value.

27. The apparatus of claim 24, wherein the memory further comprises operational instructions that cause the processing module to, when the performing the correlation of the gain adjusted representation indicates detection of the possible signal:
- adjust the gain setting of the receiver section to an optimal gain setting to amplify the gain adjusted representation of the signal to produce an amplified signal; and
- after a settling delay, determine whether the amplified signal corresponds to a valid signal.

28. The apparatus of claim 24, wherein the memory further comprises operational instructions that cause the processing module to, when the comparing of the second RSSI with the signal strength threshold indicates detection of the possible signal:
- adjust the gain settings of receiver section to a nominal setting;
- after a settling delay, measure signal strength of the signal received via the receive section with the gain settings at the nominal setting to produce a nominal setting RSSI value;
- adjust the gain settings of the receiver section to an optimal setting based on the nominal setting RSSI value; and
- after a second settling delay, determine whether the amplified signal corresponds to a valid signal.

* * * * *